United States Patent
Miersch

(10) Patent No.: US 10,969,022 B2
(45) Date of Patent: Apr. 6, 2021

(54) DETACHABLE TAP HAVING A SPRING ELEMENT FOR FASTENING AND PRESTRESSING

(71) Applicant: OLYMPUS WINTER & IBE GMBH, Hamburg (DE)

(72) Inventor: Hannes Miersch, Hamburg (DE)

(73) Assignee: OLYMPUS WINTER & IBE GMBH, Hamburg (DE)

( * ) Notice: Subject to any disclaimer, the term of this patent is extended or adjusted under 35 U.S.C. 154(b) by 90 days.

(21) Appl. No.: 16/333,562

(22) PCT Filed: Sep. 12, 2017

(86) PCT No.: PCT/DE2017/000295
§ 371 (c)(1),
(2) Date: Mar. 14, 2019

(87) PCT Pub. No.: WO2018/050140
PCT Pub. Date: Mar. 22, 2018

(65) Prior Publication Data
US 2019/0234518 A1   Aug. 1, 2019

(30) Foreign Application Priority Data

Sep. 15, 2016 (DE) ................ DE10 2016 011 184.4

(51) Int. Cl.
*F16K 5/02* (2006.01)
*F16K 5/16* (2006.01)

(52) U.S. Cl.
CPC ............ *F16K 5/0292* (2013.01); *F16K 5/165* (2013.01)

(58) Field of Classification Search
CPC .......... F16K 5/0292; F16K 5/08; F16K 5/167; F16K 5/162; F16K 5/02; F16K 5/165
(Continued)

(56) References Cited

U.S. PATENT DOCUMENTS 231,283 A * 8/1880 Cushing ................ F16K 27/067
251/309
1,357,608 A * 11/1920 Blackmore ............... F16K 5/02
251/181

(Continued)

FOREIGN PATENT DOCUMENTS

CN   104728319 A   6/2015
DE   1 871 833 U   5/1963
(Continued)

OTHER PUBLICATIONS

Jul. 22, 2020 Chinese Office Action issued in Chinese Patent Applicaiton No. 201780056360.5.
(Continued)

*Primary Examiner* — Jessica Cahill
(74) *Attorney, Agent, or Firm* — Oliff PLC

(57) ABSTRACT

A tap for producing and disconnecting a fluidic connection between at least two connector parts. The tap includes one connecting and disconnecting element, a manual actuating element for rotating the connecting and disconnecting element. The manual actuating element and the connecting and disconnecting element are coupled mechanically. The tap includes a main body having at least one connector part and an interior space for receiving the connecting and disconnecting element, the interior space includes a contact surface for being brought into contact with the connecting and disconnecting element.

18 Claims, 12 Drawing Sheets

Figure 1:
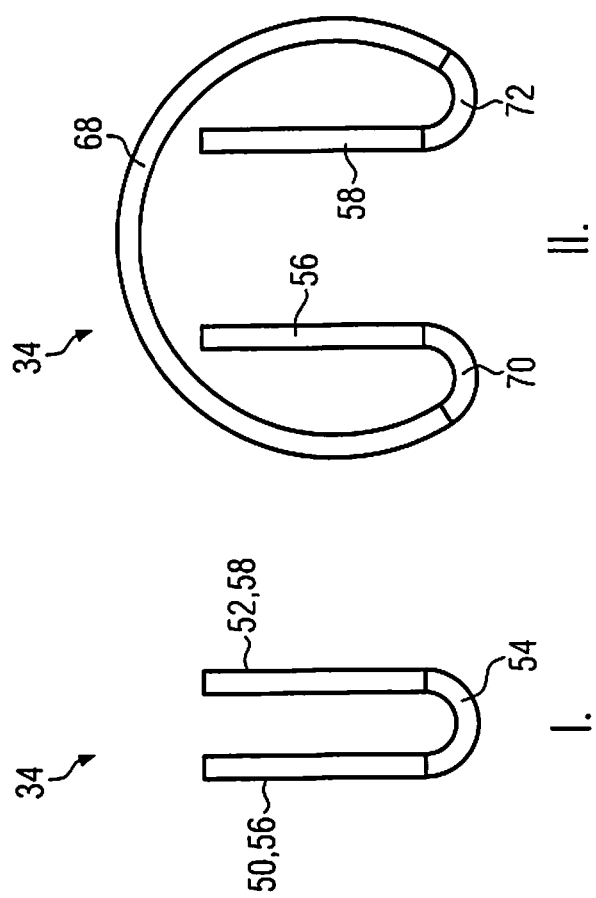

(58) Field of Classification Search
USPC .................................. 137/454.2; 251/309
See application file for complete search history.

(56) References Cited

U.S. PATENT DOCUMENTS

| | | | | |
|---|---|---|---|---|
| 1,561,867 | A | * | 11/1925 | Larsen ...................... F16K 5/02 251/181 |
| 2,147,851 | A | * | 2/1939 | Mallon ................... F16K 5/162 137/246.22 |
| 2,150,198 | A | | 3/1939 | Werneman |
| 2,285,223 | A | * | 6/1942 | Mueller .................... F16K 5/08 74/548 |
| 2,708,562 | A | | 5/1955 | Schmid |
| 3,093,358 | A | * | 6/1963 | Wakeman ............... F16K 5/025 251/309 |
| 3,195,856 | A | | 7/1965 | Arrison |
| 3,779,513 | A | * | 12/1973 | Levine ...................... F16K 5/08 251/309 |
| 4,014,512 | A | * | 3/1977 | Cheever .................. F16K 5/165 251/309 |
| 4,657,222 | A | * | 4/1987 | Tullio ..................... F16K 5/162 251/162 |
| 6,012,702 | A | | 1/2000 | Heimberger |

FOREIGN PATENT DOCUMENTS

| | | |
|---|---|---|
| EP | 0 863 340 A2 | 9/1998 |
| FR | 1195190 A | 11/1959 |
| FR | 1261017 A | 5/1961 |
| GB | 466425 A | 5/1937 |

OTHER PUBLICATIONS

Feb. 18, 2020 European Office Action issued in European Patent Application No. 17778165.5.
Jul. 18, 2017 Office Action issued in German Patent Application No. 102016011184.4.
Nov. 30, 2017 International Search Report issued in International Patent Application No. PCT/DE2017/000295.
English-language translation dated Nov. 26, 2020 Chinese Office Action issued in Chinese Application No. 201780056360.5.

* cited by examiner

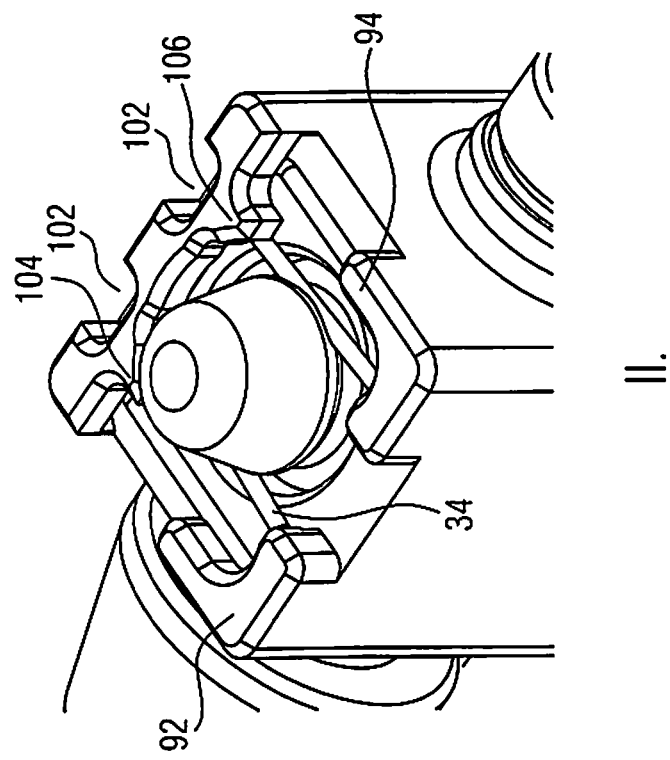
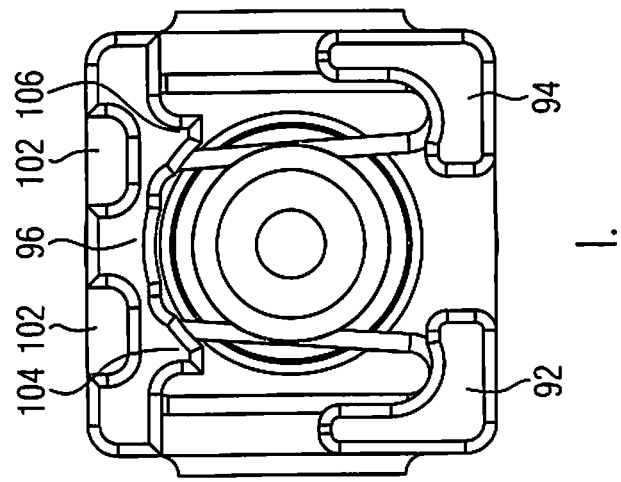
FIG. 9

DETACHABLE TAP HAVING A SPRING ELEMENT FOR FASTENING AND PRESTRESSING

The present invention relates to a tap for producing a fluidic connection between at least two connector parts and for disconnecting of the fluidic connection in accordance with the preamble of claim 1. Thereby, the tap is preferably designed to be detachable or dismantlable.

Taps for producing a fluidic connection are known from prior art. The publication EP0863340A2 discloses, for example, a tap with a housing and a rotatable cock plug within the housing, said cock plug bearing with sealing surfaces bearing against the sealing surfaces of the housing in its working position and being capable of being brought out of its working position into an intermediate position (b) upon releasing its detachable connection with the housing, where the sealing surfaces are out of contact and the housing and the cock plug remain connected. The cock plug is thereby latched to the housing in a form-fitting and positively locking manner and can be moved into the intermediate position upon overcoming this latching.

Particularly in the biological and medical field, it must be ensured that a tap, which may be used in many ways, is easily dismantlable for cleaning by rinsing and for disinfection, wherein the assembling and dismantling of the tap should be possible and be easy. Furthermore, such a tap should preferably be capable of being manufactured at a low level of cost.

Therefore, it is the object of the present invention to create a preferably dismantlable tap, which can be easily assembled and dismantled and is thereby inexpensive.

The previously mentioned task is achieved according to the invention by means of a tap in accordance with claim 1. The tap according to claim 1 preferably comprises at least one connecting and disconnecting element for producing the fluidic connection and for disconnecting the fluidic connection, a manual actuating element for rotating the connecting and disconnecting element, and a main body. Thereby, the connecting and disconnecting element is conical at least in sections and comprises at least one passage opening for producing the fluidic connection, wherein the manual actuating element and the connecting and disconnecting element are coupled mechanically.

Preferably, the manual actuating element and the connecting and disconnecting element are elements of a single device, thereby always being connected to each other.

The main body comprises at least one connector part and preferably a plurality of or all connector parts and an interior space for receiving the connecting and disconnecting elements, wherein the interior space comprises a contact surface for being brought into contact with the connecting and disconnecting element, wherein the contact surface is of negative configuration at least in sections with respect to the conical surface component of the connecting and disconnecting element. According to the invention, at least one spring element is provided for form-fitting fixing the position of the connecting and disconnecting element with respect to the main body and preferably for producing a surface pressure and/or for the fixing of the contact faces between the contact surface and the conical surface component of the connecting and disconnecting element. Thereby, the spring element is preferably arranged in or on the main body. Furthermore, the connecting and disconnecting element for dismantling or assembling can be moveable with relation to the spring element in its axial extension direction.

This solution is favourable since a simple and therefore inexpensive arrangement is provided where the spring element causes a positioning and securing of the connecting and disconnecting element with respect to the main body. From this, As a result a good assembly and dismantling capability results.

Further embodiments are the object of the subclaims and the following description parts.

In accordance with a preferred embodiment of the present invention, the connecting and disconnecting element comprises an extension in its axial extension direction bearing against the conical section with the smallest diameter, wherein the extension comprises a wall, wherein the wall can be circumferential and is preferably slanted towards the axial extension direction, wherein the at least one spring element or at least one fixing agent impinged by the spring element contacts the wall for producing a tensile force within the connecting and disconnecting element, preferably for producing the surface pressure between the contact surface and the conical surface component of the connecting and disconnecting element. This embodiment is favourable since, in particular, due to the interaction of the slanted wall with the spring element or with the fixing agent, a sealing effect between the connecting and disconnecting element and the main body is produced. The sealing effect can be influenced here by spring forces at various levels. The preferably circumferential wall, which is slanted towards the extension direction, is preferably slanted in such a way that the conical surface and the slanted wall are orientated towards each other at an angle of less than 180°, in particular, of less than 178° or of less than 175° or of less than 170° or of less than 165°. In addition or as an alternative however, a sealing means, such as an O-ring, can be provided for sealing the connecting and disconnecting element against the main body. Preferably, a plurality of sealing means, preferably precisely two of them, are provided for sealing the connecting and disconnecting element with relation to the main body.

In accordance with another preferred embodiment of the present invention, the spring element comprises at least two elongated components, wherein the two elongated components are connected to each other by means of a bent component, wherein the two elongated components are designed as two elongated, preferably straight, positioning components and contact the preferably slanted circumferential wall for producing a tensile force within the connecting and disconnecting element preferably for producing a surface pressure between the contact surface and the conical surface component of the connecting and disconnecting element. This embodiment is favourable since the spring element can be simply manufactured and the positioning components can be pressed apart from each other for assembling or dismantling. Additionally, the spring or the spring element also secure the position of the connecting and disconnecting element by initially having to overcome the spring force when dismantling.

In accordance with another preferred embodiment of the present invention, the spring element additionally comprises at least two elongated, preferably straight, holding components, wherein the elongated holding components form the ends of the spring element and are coupled to the main body in a form-fitting or frictionally locking manner and whereby each positioning component is connected to a holding component via a bent component. The spring element thereby preferably forms an M-shaped form, wherein the wrap angle of the radius of the bent component connecting the two positioning components is smaller than the wrap angle of the radius of a bent component, which connects a holding component to a positioning component. The radius of the bent component connecting the two positioning components is preferably greater than 1 mm or at least 2 mm or at least 3 mm larger than the radius of a bent component, which connects a holding component to a positioning component. The embodiment is favourable since the positioning components can be securely brought into contact with the connecting and disconnecting element and the spring force production and/or fixing of the spring element to the main body is caused by means of the holding components and/or the other bent components. This embodiment is furthermore favourable since the holding components form clear regions for bearing on the main body and the forces transferred via the connecting disconnecting element onto the spring when rotating the connecting and disconnecting element are reliably transferred to the main body.

In accordance with another preferred embodiment of the present invention, the bent component comprises sections with different radii, wherein a main section comprises a radius that is greater than the radii of two secondary sections, wherein the positioning components are connected to the main section via the secondary sections. This embodiment is favourable since the spring element can be manufactured in an inexpensive manner and the spring force required for generating the required pressing force between the connecting and disconnecting element and the main body is reliably provided due to the considerably bent sections (secondary sections and main section). Preferably, in the case of all the spring elements mentioned herein, it always has to do with spring elements made of metal, plastic or a composite material.

In accordance with another preferred embodiment of the present invention, the spring element additionally comprises at least three elongated holding components, wherein the positioning components form the ends of the spring element, wherein each positioning component is connected to a holding component via a bent element, wherein a central elongated holding component is connected by two bent components on both sides to one of the other holding components respectively, wherein the holding elements are coupled to the main body in a form-fitting or frictionally locking manner. Preferably, the holding components, being respectively connected to each other via a bent component, are orientated towards each other at an angle between 70° and 110°, preferably at an angle of 90°. This embodiment is favourable since even more contact possibilities for the transfer of forces are available due to the three elongated, preferably straight, holding components. Thereby, the conical contact area seals between the connecting and disconnecting element and the main body even during handle rotation, where the user pulls on the handle.

In accordance with another preferred embodiment of the present invention, two spring elements, preferably at least two or precisely two or a maximum of two spring elements, are provided In addition, it is conceivable that each spring element comprises an elongated, more preferably straight, holding component and an elongated, more preferably straight, positioning component, wherein the holding component and the positioning component are each connected to each other by means of a bent component. The positioning components thereby preferably contact the wall in sections, which is preferably slanted at least in sections and is preferably circumferential in its entirety or in sections to generate a tensile force in the connecting and disconnecting element preferably to produce a surface pressure between the contact surface and the conical surface component of the connecting and disconnecting element. Thereby, the elongated holding components are coupled to the main body in a form-fitting or frictionally locking manner, wherein the positioning components each with an end spaced away from the bent component interact with the main body in a form-fitting manner and wherein a pin component adjoins the holding components respectively, which orthogonally extends towards a level, which is spanned by the positioning components and the holding components, wherein each pin component is inserted within a bore hole or a recess in the main body respectively. This embodiment is favourable since the spring elements and the holding elements that are designed to hold the spring elements can be built to be very slim and small with relation to other construction forms, whereby material and weight savings result.

In accordance with another preferred embodiment of the present invention, the main body comprises a spring guide to receive the spring element, wherein the spring element comprises a bent section, by means of which it is coupled to the spring guide, wherein the bent component is a part of a bent component that encloses the main body in the circumferential direction at least for the most part and, preferably, at more than 270°, wherein the bent section forms a securing part on the one hand, which is coupled to the main body or the fixing agent and, on the other hand, another bent component adjoins the bent component, wherein the other bent component and the bent component are spaced away from each other by an elongated, preferably straight, component and wherein the other bent component and the straight component are surrounded by the bent component at least for the most part. This embodiment is favourable since, by means of the spring element, a very precise production of the pressing force acting on the connecting and disconnecting element can be established. Furthermore, the spring element can very easily be arranged on the main body.

In accordance with another preferred embodiment of the present invention, the spring element forms a securing part, which extends in an elongated manner, more preferably in a straight line, which is designed to be introduced into a recess designated for this or a recipient region of the main body designated for this, wherein a power transmission part adjoins the securing part, wherein, by means of the power transmission part, the fixing element is impinged by a pressing force in the direction of the connecting and disconnecting element. This embodiment is favourable in that the fixing element can be added and designed in a very precise manner, more preferably, a it can preferably have a geometry adapted to the preferably slanted wall and/or be made of a defined material or can be coated.

In accordance with another preferred embodiment of the present invention, a plurality of fixing agents are provided, wherein the fixing agents can each be moved in a radial direction via a guide designed with the main body and can be pressed towards each other by means of the spring element. This embodiment is favourable since the fixing element can be introduced in a very precise manner, for example, from two opposite sides. Furthermore, the fixing elements can preferably be formed, in particular, having a geometry adapted to the slanted wall and/or be made of a defined material or can be coated.

In accordance with another preferred embodiment of the present invention, the tap can be dismantled in a non-destructive manner at least into the parts: connecting and disconnecting element, spring element and main body. This solution is favourable since worn parts can be easily replaced and/or a cleaning and/or sterilisation of individual or all components can be initiated.

The connecting and disconnecting element can specifically be designed as a cock plug or a stopcock.

In accordance with another preferred embodiment, the spring element consists of a bent piece of wire.

In accordance with another preferred embodiment of the present invention, a plurality of structurally identical spring elements, more preferably two or three structurally identical ones.

In accordance with another preferred embodiment of the present invention, at least three structurally identical spring elements are provided, wherein each spring element is rotatably mounted with one end in a recess around a rotational axis and is held with another end in a form-fitting manner by holding elements in the extension direction of the rotational axis.

In all of the cases, in which the word is used within the scope of the present invention, the use of the word "essentially" preferably defines a deviation within the range of 1%-30%, more preferably 1%-20%, more preferably 1%-10%, more preferably 1%-5%, in particular 1%-2% from the determination, which would have been the case without the use of this word. Individual or all illustrations of the figures described in the following are preferably to be viewed as constructional drawings, meaning the dimensions, proportions, functional relationships and/or arrangements resulting from the figure(s) preferably correspond precisely or preferably essentially those of the apparatus according to the invention or of the product according to the invention. Other advantages, objectives and features of the present invention will be explained based on the following description of the enclosed drawings, in which apparatuses according to the invention are shown as an example. Elements of the apparatuses and method according to the invention, which, in the figures, at least essentially coincide with regard to their function can be identified using the same reference numbers, wherein these components and elements do not have to be numbered or explained in all figures. The invention shall now be described using the enclosed figures purely as an example.

Figure 2:
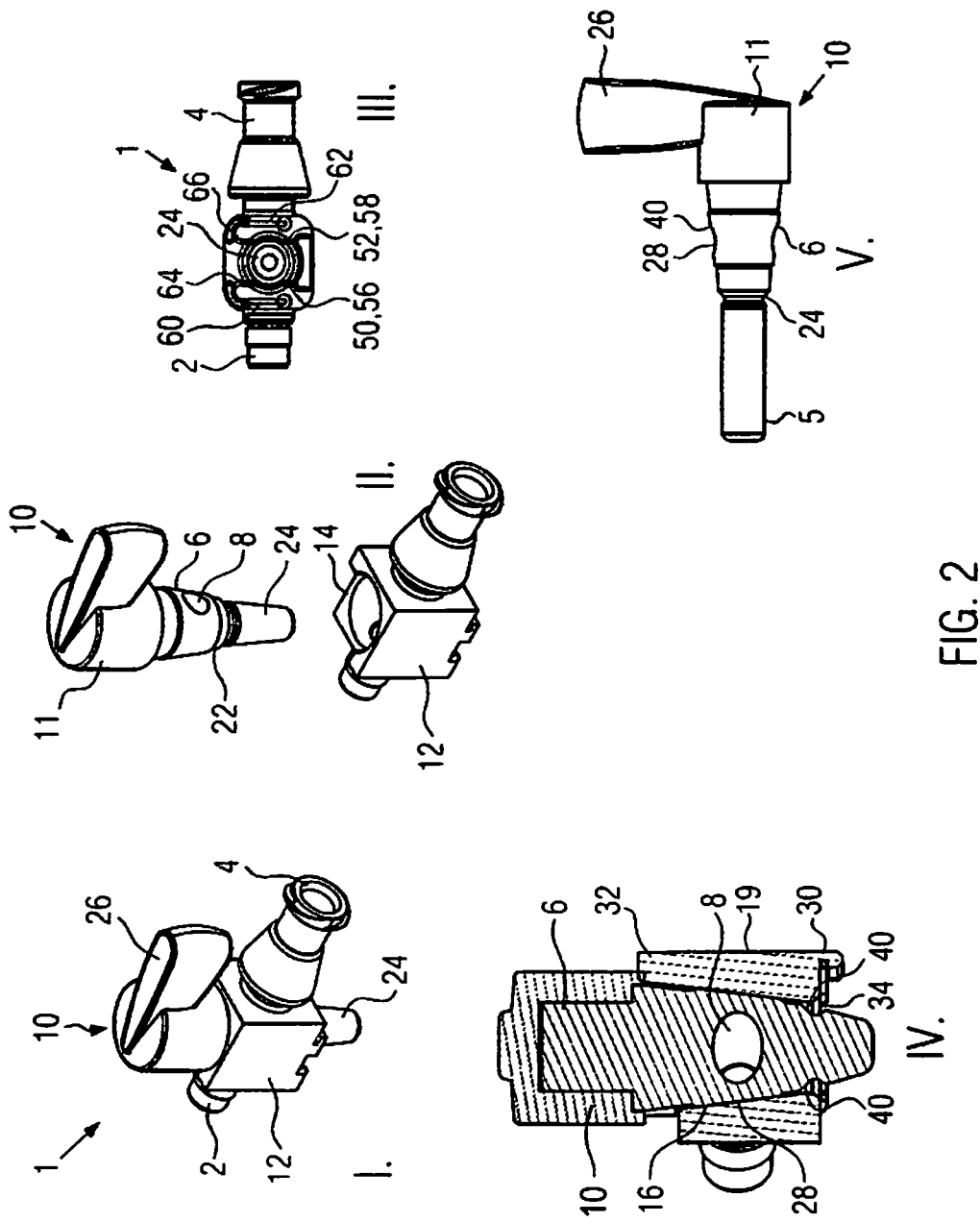
Figure 3:
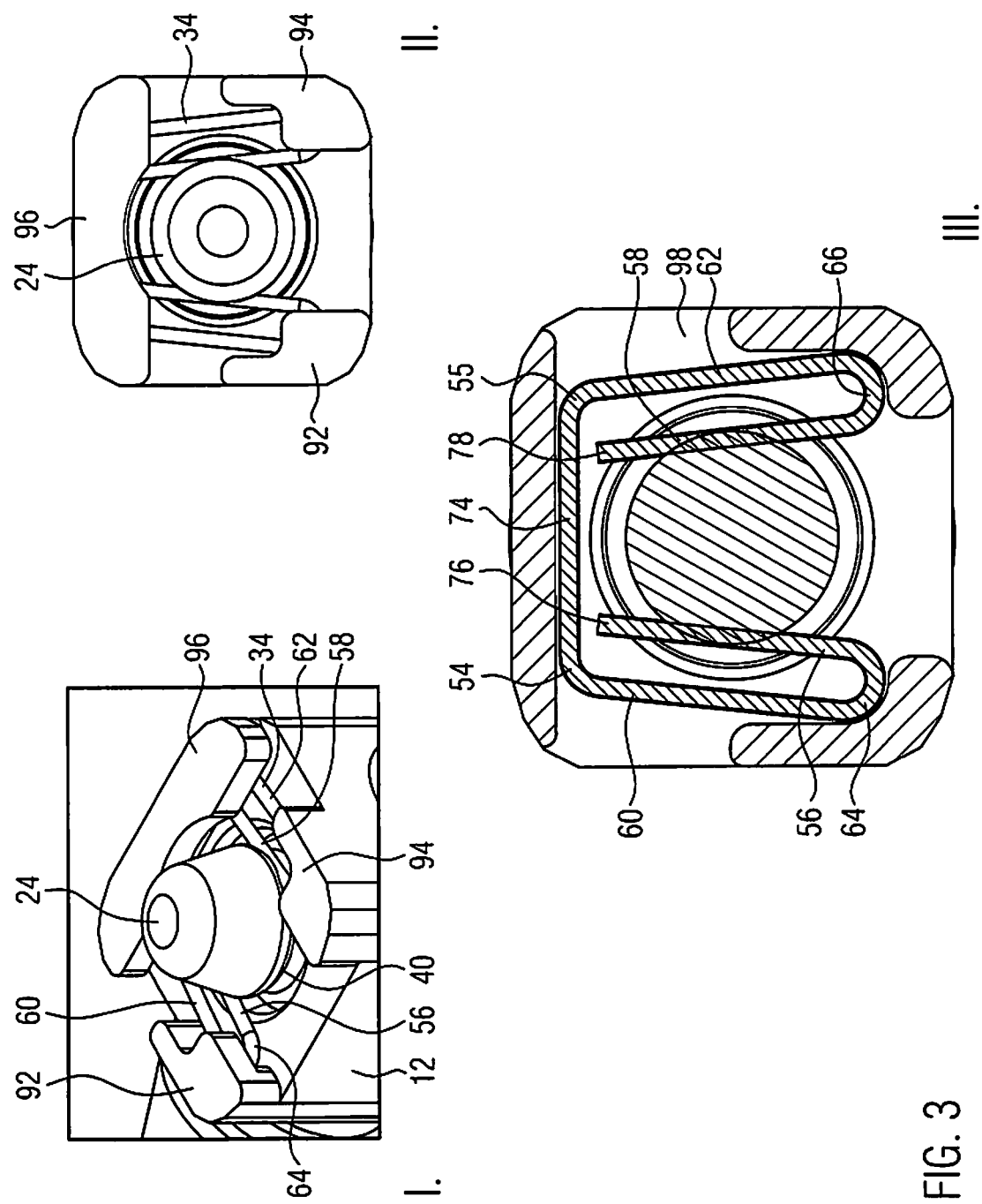
Figure 4:
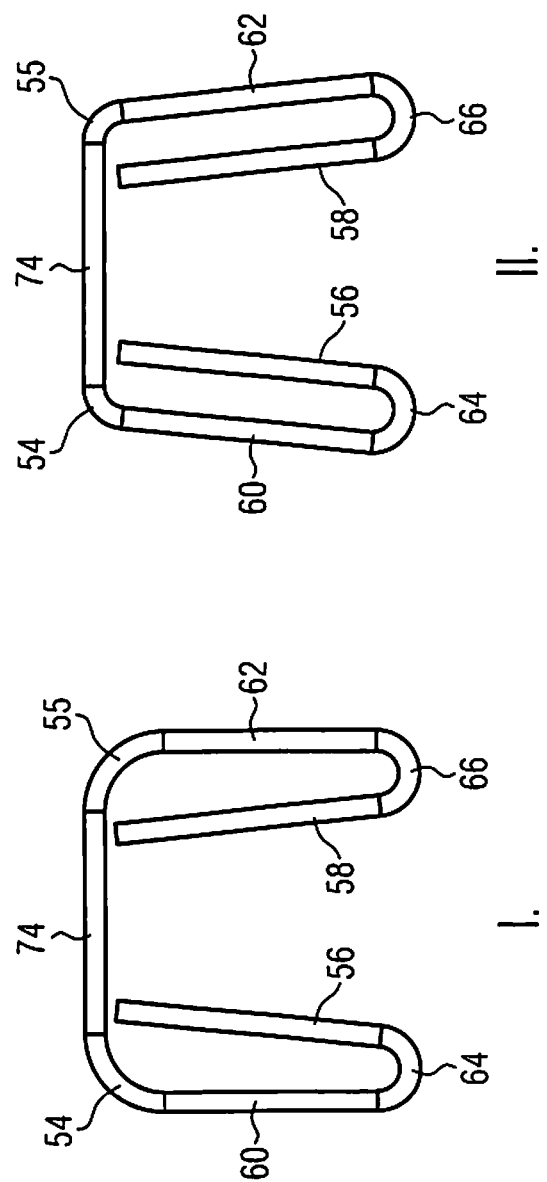
Figure 5:
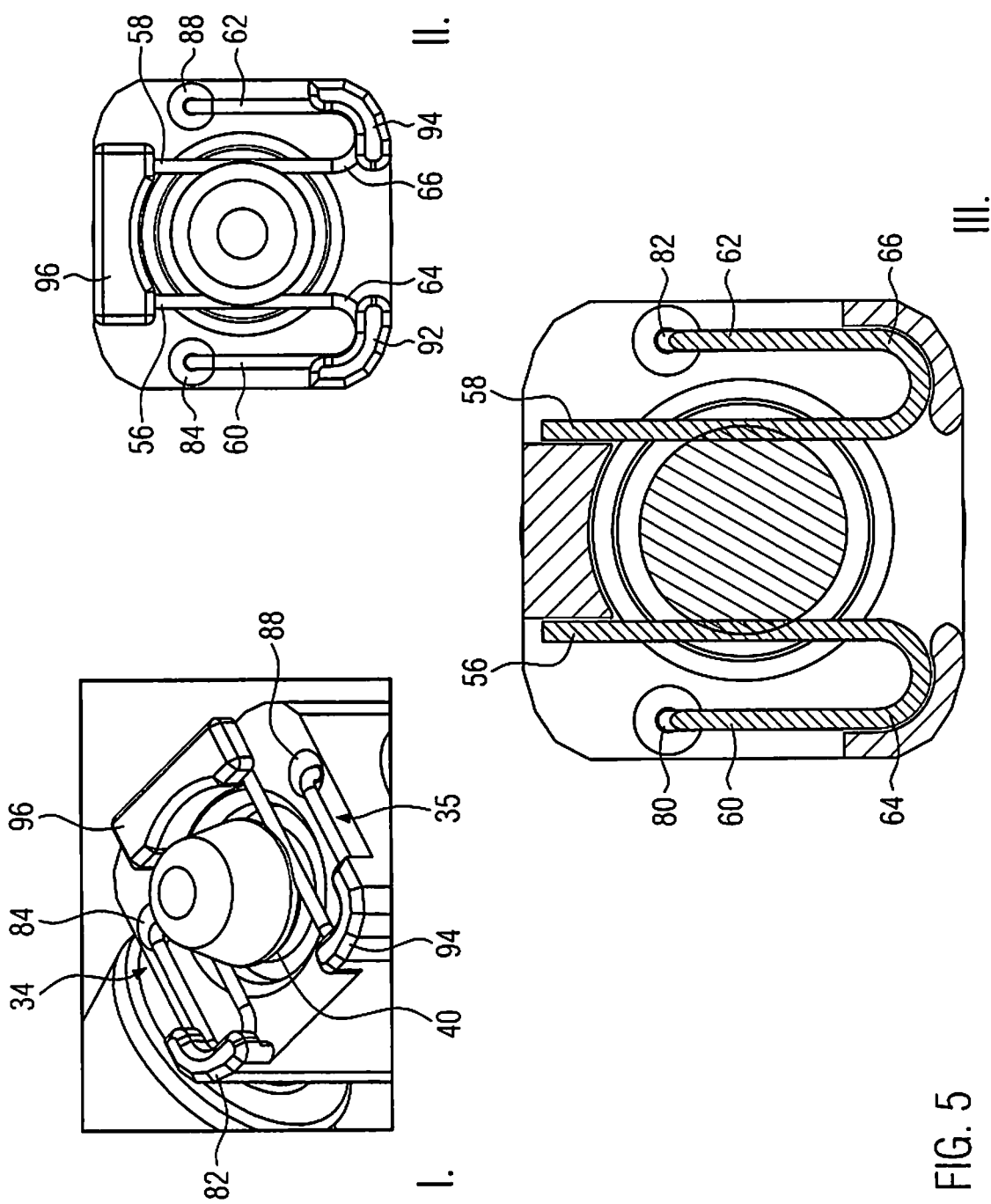
Figure 6:
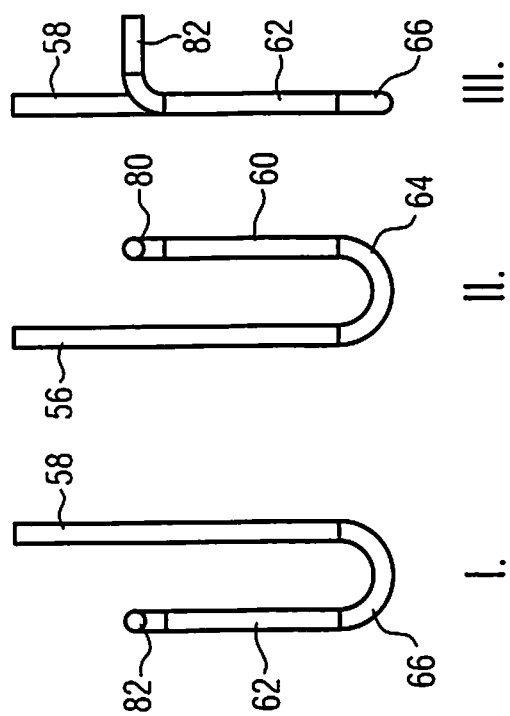
Figure 7:
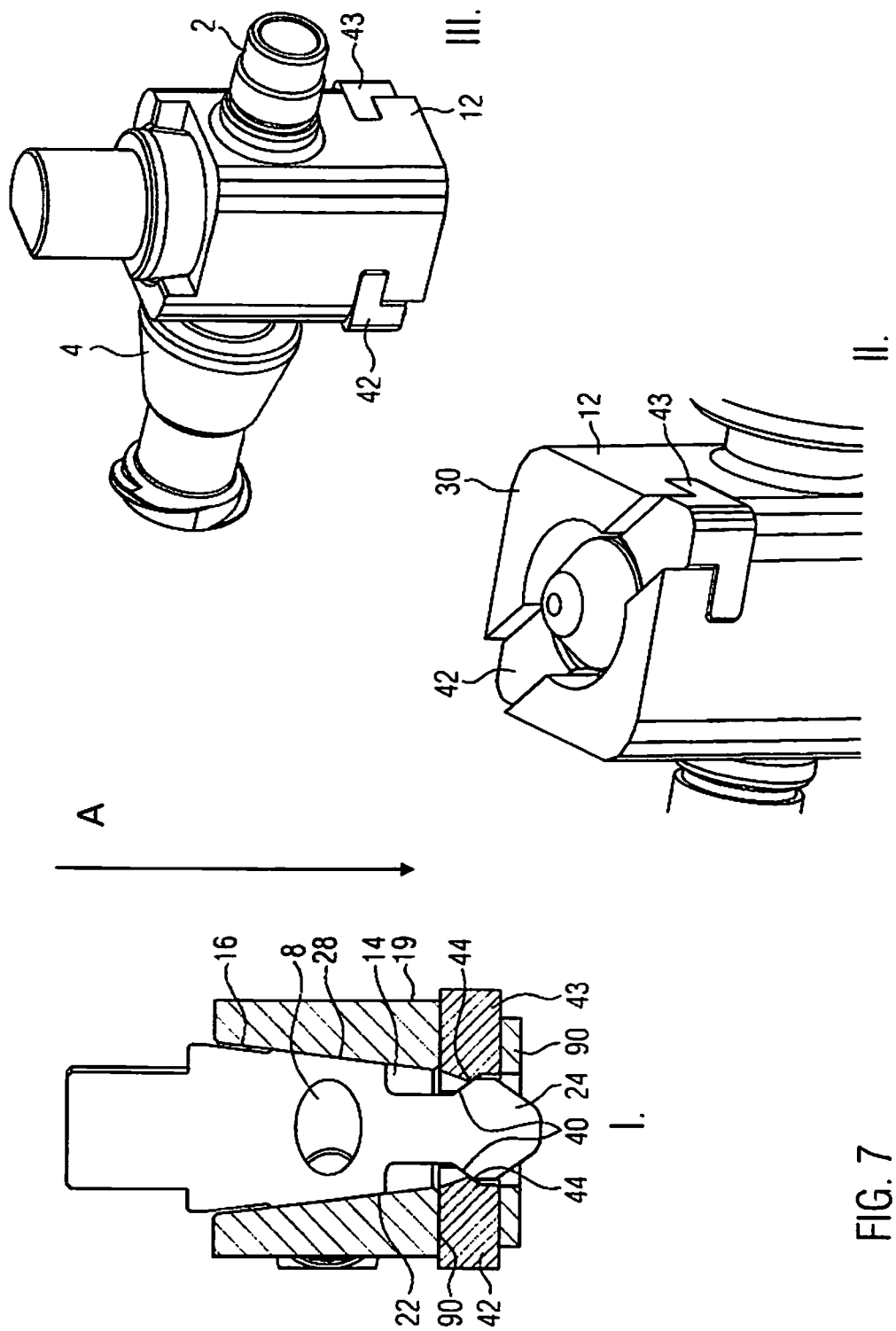
Figure 8:
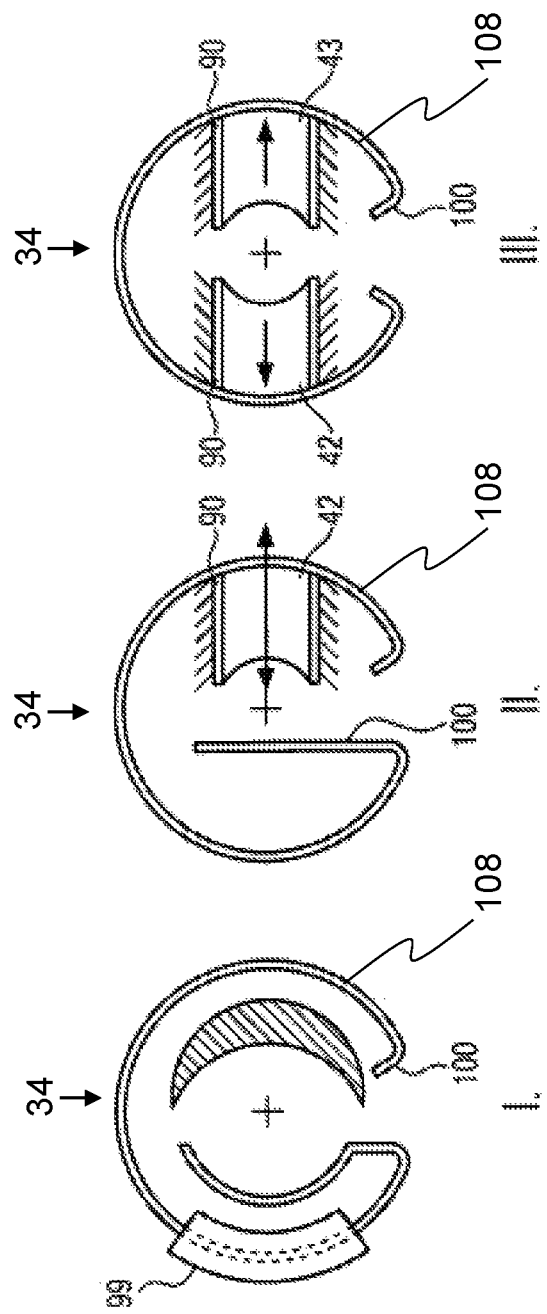
Figure 10:
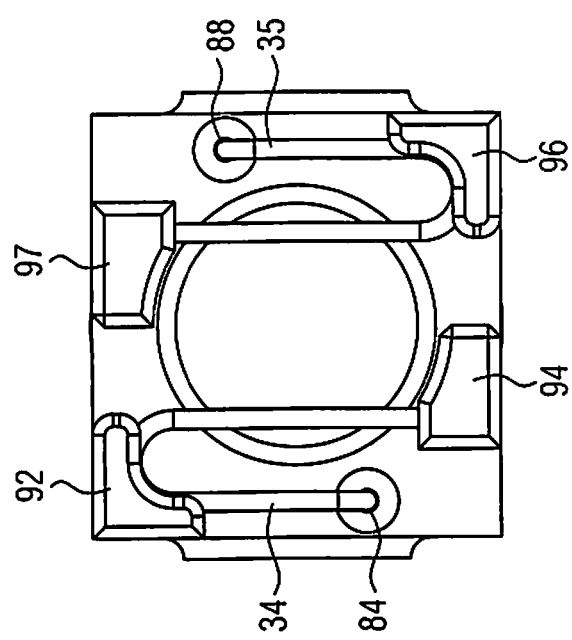
Figure 11:
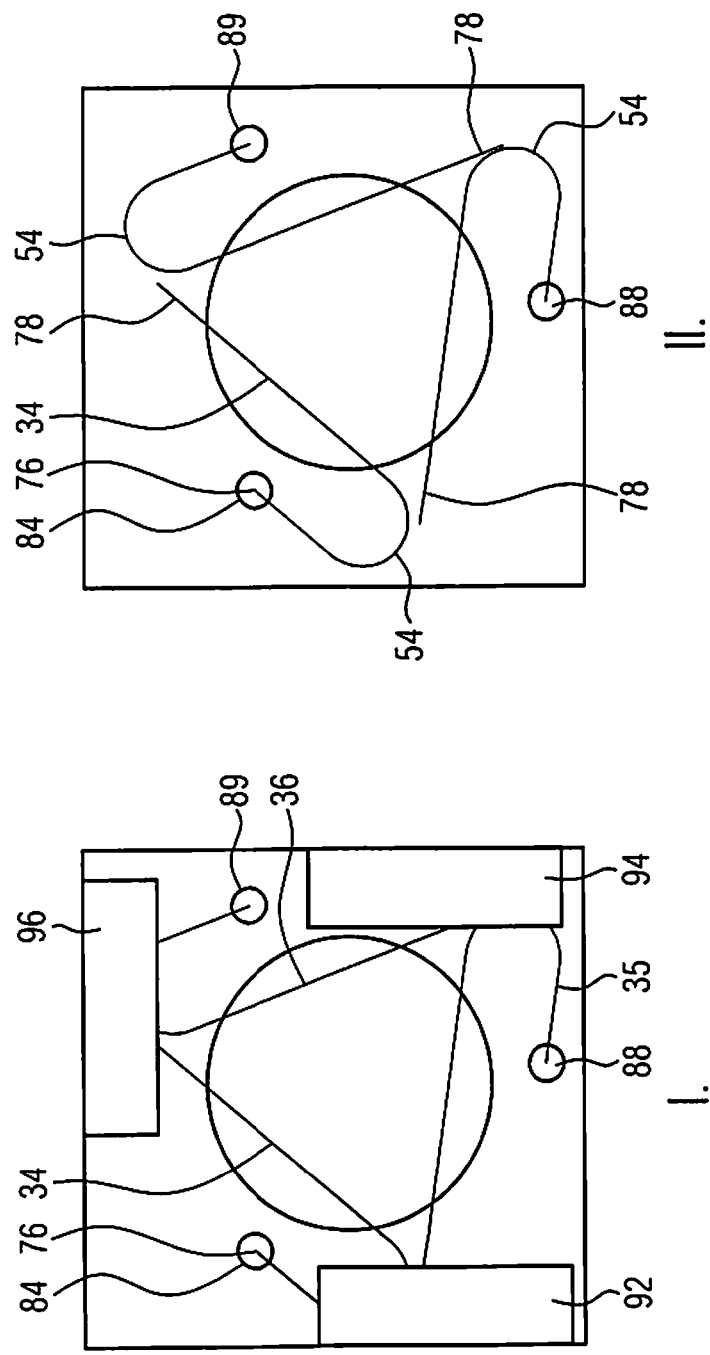
Figure 12:
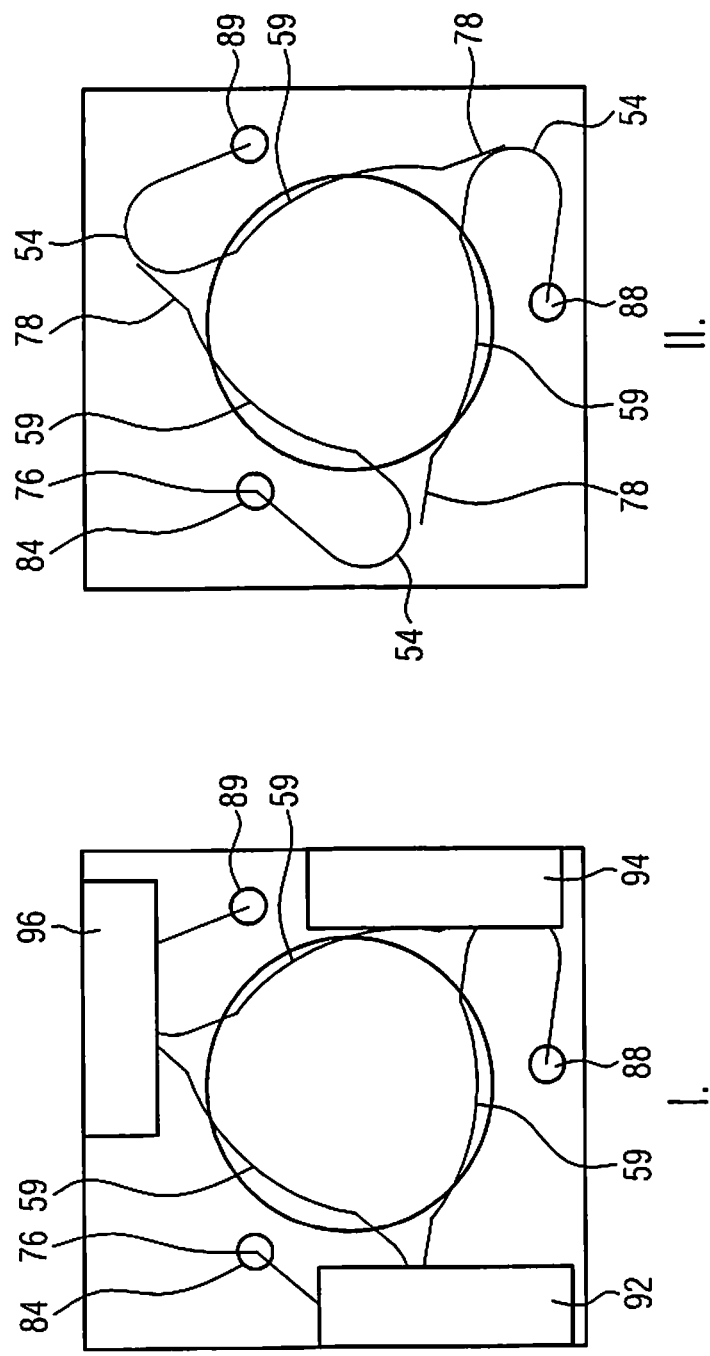

The figures show:

FIG. 1 as an example, two spring elements and how they can be used within the tap according to the invention;

FIG. 2 a plurality of perspective illustrations of a first embodiment of the present invention, FIG. 3 illustrations of features in accordance with a second embodiment of the present invention, FIG. 4 examples of spring elements, which can be used in accordance with the second embodiment, FIG. 5 illustrations of features in accordance with a third embodiment of the present invention, FIG. 6 the spring elements shown in FIG. 5 in planar views, FIG. 7 illustrations of features in accordance with a fourth embodiment of the present invention, FIG. 8 examples of spring elements, which can be used in accordance with the fourth embodiment (variant III.) or an alternative embodiment (variants I. and II.);

FIG. 9 a top view and a perspective view of an embodiment where the spring element known from FIG. 4 I. is used, FIG. 10 a top view of another exemplary embodiment, in accordance with which two preferably structurally identical and, being particularly preferred, unsymmetrical spring elements can be used, FIG. 11 two exemplary illustrations of an embodiment, in accordance with which three spring elements are used and FIG. 12 a modified variant of the embodiment shown in FIG. 12, wherein the spring elements comprise a bent section for bearing on the connecting and disconnecting element.

In FIG. 1, a first example of a spring element 34 is shown as I. as it is preferably used within the scope of the present invention. The spring element 34 thereby comprises two components 50, 52, which preferably extend in an elongated manner, more preferably, in a straight line, which, according to the invention, are intended to bear on the connecting and disconnecting element 6 (cf. FIG. 2 II. for example) in order to created tensile forces within the connecting and disconnecting element 6. Therefore, the components, which preferably extend in a straight line, can also be referred to as a first positioning component 56 and as a second positioning component 58. Both positioning components 56, 58 are connected to each other via a bent component 54. The bent component 54 and the ends of the spring element 34 can preferably be coupled in a form-fitting manner to a main body 12 (cf. FIG. 2 IV. for example), wherein forces can be transferred onto the main body 12 in the extension direction A of the connecting and disconnecting element 6 due to the form-fitting coupling.

Another example for a spring element 34 is shown by FIG. 1 II. With relation to the illustration in FIG. 1 I., the bent component 54 encloses the first and second positioning component 56, 58 at least in one direction for the most part. The bent component 54 is formed by a bent main section 68 and two bent secondary sections 70 and 72. Both secondary sections 70, 72 preferably comprise the same radius, wherein the radius of the main section 68 is preferably greater by a factor of 2 or a factor 2, 5 or a factor of 3 than the radius of a secondary section 70, 72. The positioning sections 56, 58 preferably comprise a length between 3 mm and 10 mm, more preferably, they are longer than 3 mm or longer than 4 mm or longer than 5 mm or precisely 5 mm long. Furthermore, the positioning means 56, 58 are preferably spaced away from each other between 2 mm and 10 mm, in particular, being spaced away from each other in parallel, wherein the positioning means 56, 58 are preferably spaced away from each other by at least 2 mm or at least 3 mm or at least or precisely 4 mm.

FIG. 2 with illustrations I.-V. shows different views and components of an exemplary embodiment of the present invention.

In FIG. 2 I., the dismantlable tap 1 is shown in an assembled or mounted state. It is evident that the tap 1 comprises a main body 12, which comprises at least one first connector part 2 and a second connector part 4. Here, the connector parts 2, 4 can be designed to be identical or different. A manual actuating element 10 is inserted into the main body 12. The manual actuating element 10 serves to rotate the connecting and disconnecting element 6, wherein the manual actuating element 10 and the connecting and disconnecting element 6 are coupled mechanically, more preferably, being made of a single piece. Preferably, the connecting and disconnecting element 6 is thereby viewed as an integral component of the manual actuating element 10. The manual actuating element 10 preferably also forms a handle part 26, which preferably extends in a lever-type way orthogonally towards the longitudinal extension direction of the connecting and disconnecting element 6. Furthermore, reference number 24 identifies an extension, which preferably extends out of the main body 12 and thereby, preferably is not surrounded by the main body 12 in the circumferential direction at least in sections.

FIG. 2 II. shows the tap 1 according to the invention in a dismantled state. It is evident that the connecting and disconnecting element 6 comprises a passage hole 8. In the orientation shown, the passage hole 8 in FIG. 2 I. thereby connects the first connector part 2 and the second connector part 4, whereby a fluid, in particular, a fluid or a gas, can be guided from one connector part to the other connector part. The extension 24 is arranged on the side of the connecting and disconnecting element 6, on which the connecting and disconnecting element forms the conical section with the smallest 22, meaning on the side opposite to the handle part 26. The reference number 11 identifies a base part of the manual actuating element 10, wherein the handle 26 is connected to the connecting and disconnecting element 6 mechanically via the base part 11, more particularly as a single piece. Furthermore, reference number 14 identifies the interior space formed by the main body 12, which is designed to receive the connecting and disconnecting element 6.

FIG. 2 III shows a top view of the underside of the tap according to the invention 1 in the assembled state. Thereby, it is evident that the spring element 34 also comprises at least two elongated components 50, 52. The two elongated components 50, 52 are preferably designed as two elongated positioning components 56, 58 and, in particular, preferably contacts a wall 40 (cf. FIG. 2 IV.) to produce a tensile force in the connecting and disconnecting element 6 preferably to produce the surface pressure between the contact surface 16 and the conical surface component 28 of the connecting and disconnecting element 6. Furthermore, the spring element 34 additionally comprises two elongated holding components 60, 62, wherein the elongated holding components 60, 62 form the ends of the spring element 34 and are coupled to the main body 12 in a form-fitting or frictionally locking manner.

Here, each positioning component 56, 58, which preferably extends in a straight line, is connected to a holding component 60, 62, which preferably extends in a straight line, via a bent component 64, 66.

FIG. 2 IV. shows a sectional illustration through the tap 1 according to the invention in an assembled state. Thereby, the spring element 34 bears against the wall 40, which is preferably slanted towards the extension direction A of the connecting and disconnecting element 6 and, being particularly preferred, is circumferential and, via it, introduces forces into the connecting and disconnecting element 6. The forces introduced produce tensile forces in the connecting and disconnecting element 6. Due to the tensile forces, the conical surface component 28 of the connecting and disconnecting element 6 is pressed onto the contact surface 16 of the main body 12 with a preferably negative configuration with respect to it. The slanting of the conical surface of the connecting and disconnecting element 6 towards the longitudinal extension direction A of the connecting and disconnecting element 6 lies between 1° and 10° and, preferably between 2° and 8° in the preferred embodiments described herein. An upper end of the main body 12 is identified with reference number 32 and a lower end of the main body 12 is identified with reference number 30. Thereby, the connecting and disconnecting element 6 is inserted into the main body 12 within the region of the upper end 32 and then preferably exits again in sections from the main body 12 within the region of the lower end 30. The outer surface of the main body 12 is identified with reference number 19. The main body 12 preferably consists of metal, in particular, steel or a plastic material or comprises metal or a plastic material.

FIG. 2 V. shows an example of an alternative manual actuating element 10, which can alternatively be used. Here, the opening 8 must not be designed as a straight passage opening but can extend starting from the conical circumferential wall of the connecting and disconnecting element 6 in the longitudinal extension direction A and therefore, can supply or discharge the fluid via a connector part 5 arranged or formed on the manual actuating element 10.

FIG. 3 I. shows a schematic illustration of an underside of the tap 1 according to the invention in an assembled state. In accordance with this illustration, a spring element 34 is used, which comprises two positioning components 56, 58 that are orientated slanting towards one another.

The spring element 34 additionally comprises at least three elongated, more preferably straight, holding components 60, 62, 74 (cf. FIG. 3 II.). The positioning components 56, 58 form the ends 76, 78 of the spring element 34 and preferably extend in a straight line. Hereby, each positioning component 56, 58 is connected to a holding component 60, 62 via a bent component 64, 66, wherein a central elongated holding component 74 is connected on both sides to one of the other holding components 60, 62 respectively by means of two bent components 54, 55. The holding components 60, 62, 74 are coupled to the main body 12 in a form-fitting or frictionally locking manner. The main body 12 additionally comprises the holding elements 92, 94, 96. The holding elements 92, 94, 96 thereby each form at least one recess for providing at least one contact surface, on which the bent sections 54, 55, 64, 66 and/or the holding components 60, 62, 74 bear in the extension direction A of the connecting and disconnecting element 6. The main contact surface, on which the spring element 34 bears, is identified with reference number 98.

FIG. 3 II. shows a top view of the arrangement shown in FIG. 3 I.

FIG. 3 III shows a sectional illustration of the view from FIG. 3 I. Preferred contact areas on the holding elements 92, 94, 96 can be taken from this illustration. Furthermore, this illustration shows that the contact areas are preferably of negative configuration at least in sections with respect to the bent components 64 and 66.

FIG. 4 shows two other examples of spring elements 34, which can be used within the scope of the present invention. Preferably, the holding components 60, 62, 74 respectively connected to each other via a bent component 54, 55 are orientated towards each other at an angle between 70° and 110°, preferably at an angle of between 80° and 100° or at an angle between 80° and 90° or at an angle between 90° and 100° or at an angle of 90°. Such spring geometries are favourable since the spring elements 34 can be easily positioned and, in addition to the required securing characteristics, the force required to produce the sealing effect can be provided. The spring element 34 thereby forms an M-shaped form, wherein the radius of the bent component 54 connecting the two positioning components 56, 58 is larger than the radius of a bent component 64, 66, which connects a holding component 60, 62 to a positioning component 56, 58.

In accordance with FIG. 4 I, the holding components 60, 62, which are connected to a positioning component 56, 58 via a bent component 64, 66, are orientated in parallel to each other. With relation to holding component 60, 62 respectively adjoining directly, the positioning components 56, 58 are preferably orientated at an angle of between 1° and 15° and preferably at an angle of 3° and 9°, more preferably of 4°, 5°, 6°, 7° or 8°.

In accordance with FIG. 4 II, the holding components 60, 62, which are connected to a positioning component 56, 58 via a bent component 64, 66 are orientated in parallel to the positioning component 56, 58, which adjoins directly. With relation to the third or central holding component 74 respectively, the entirety consisting of a positioning component 56, 58 and a holding component 60, 62 arranged on it via a bent component 64, 66 is preferably orientated at an angle of between 1° and 15° and preferably at an angle of 3° and 9°, more preferably of 4°, 5°, 6°, 7° or 8°.

FIG. 5 shows another exemplary embodiment of the present invention. A plurality of spring elements 34, 35, in particular, precisely two are shown here. Thereby, each spring element 34, 35 comprises an elongated, more preferably straight, holding component 60, 62 and an elongated, more preferably straight, positioning component 56, 58, The holding components 60, 62 and the positioning components 56, 58 are thereby each connected to each other by means of a bent component 64, 66, wherein the positioning components 56, 58 contact the wall 40, which is preferably slanted and, being particularly preferred, is circumferential to produce a tensile force in the connecting and disconnecting element 6 preferably to produce a surface pressure between the contact surface 16 and the conical surface component 28 of the connecting and disconnecting element 6. The holding components 60, 62 are preferably coupled to the main body 12 in a form-fitting or frictionally locking manner, more preferably via the holding elements 92, 94, 96, which are preferably formed analogously to the embodiments in FIG. 3. The positioning components 56, 58 each with an end spaced away from the bent component 64, 66 interact with the main body 12 in a form-fitting manner and wherein a pin component 80, 82 adjoins the holding components 60, 62 respectively, which orthogonally extends towards a level, which is spanned by the positioning components 56, 58 and the holding components 60, 62, wherein each pin component 80, 82 is inserted within a recess or bore hole 84, 88 in the main body 12 respectively. The recess or bore hole 84, 88 is preferably provided with a chamfer for easier insertion of the pin component 80, 82.

FIG. 6 shows the spring elements 34, 35 used in FIG. 5. Thereby, FIG. 6 I and III show spring element 35 and FIG. 6 II. shows spring element 34. In the case of the two spring elements 34, 35, the positioning component 56, 58 preferably extends in parallel to the respective holding component 60, 62.

FIG. 7 shows another preferred embodiment of the present invention.

FIG. 7 I. thereby shows a sectional illustration through the dismantlable tap 1. FIGS. 7 II. and 7 III. show perspective illustrations of the tap 1 shown in a cross-sectional view in FIG. 7 I.

Thereby, the extension 24 also forms a circumferential surface 40 orientated at a slant towards the extension direction of the connecting and disconnecting element 6. Furthermore, at least one fixing agent 42 is provided that can be displaced within a guide 90 formed in the main body 12. The fixing agent 42 is impinged by a spring force caused by a spring element 34 (cf. FIG. 8 III.) and comprises a pressure point 44, which services to press onto the surface 40. In the case shown, the main body 12 comprises a plurality of fixing elements 42, 43, more preferably, precisely two.

FIG. 8 shows three examples of how the basic concept shown in FIG. 7 can be alternatively carried out, wherein FIG. 8 II represents the basic concept.

In accordance with FIG. 8 I., the main body 12 comprises a spring guide 99 for receiving the spring element 34, wherein the spring element 34 comprises a bent section, with which it is coupled to the spring guide 99. The bent component is preferably a part of a bent component that encloses the main body 12 in the circumferential direction at least for the most part and, preferably, at more than 270°, wherein the bent section forms a securing part 100 on the one hand, which is coupled to the main body 12 or the fixing agent 42 and, on the other hand, another bent component adjoins the bent component. The other bent component and the bent component are preferably spaced away from each other by an elongated, preferably straight, component and wherein the other bent component and the straight component are surrounded by the bent component at least for the most part.

The spring element 34 from FIG. 8 II forms a securing part 100 extending in an elongated manner, more preferably in a straight line, which is for being introduced into a recess designated for this or a recipient region of the main body 12 which is designated for this. A power transmission part 108 adjoins the securing part 100, wherein, by means of the power transmission part 108, the fixing element is impinged in the direction of the connecting and disconnecting element 6 by means of a pressing force.

The FIGS. 9 I. and 9 II. represent an embodiment, which represents a modification of the embodiment shown by the figures of 3 I-3 III. The spring element 34 is also preferably designed according to FIG. 4 I. or FIG. 4 II.

The main difference with relation to the embodiment shown in FIG. 3 is the embodiment of the third holding element 96. This holding element 96, which interacts with the central holding component 74 of the spring element (cf. FIG. 3 II. or FIG. 4), is preferably designed in such a way that superimposes the first end 76 and the second end 78 of the spring element 34 by at least 1 mm and preferably by at least 2 mm an, being particularly preferred, by at least 2.5 mm and, being most preferred, by 3 mm or by at least 3.5 mm or by at least 4 mm. Therefore, the third holding element 96 forms covering projections or a first holding tab 104 and a second holding tab 106, which interact with the ends 76, 78 of the spring element 34, in particular, in a form-fitting manner.

In addition or as an alternative, the third holding element 96 can comprise one or a plurality of recesses 102, more preferably two or at least two or precisely two or three or at least three or exactly three. The at least one recess 102 preferably extends starting from the outer surface of the main body 12 into the direction of the interior space 14 of the main body 12. The recess(s) 102 is/are preferably designed in such a way that the spring element 34 is accessible via the recess(s) 102.

Being particularly preferred, the third holding element 96 thereby comprises two holding tabs 102, 104 and two recesses 102.

FIG. 10 shows a variant of the embodiment shown in FIG. 5. In accordance with this embodiment, two structurally identical spring elements 34 can be used. Preferably, each spring element 34, 35 is held onto the main body 12 by means of a bore hole or a recess 84, 88 and two holding elements 92, 94 and 96, 97 respectively. The relative positions of the first bore hole 34, of the first holding element 92 and of the second holding element 94 to each other thereby preferably correspond to the relative positions of the second bore hole 88, the third holding element 96 and the fourth holding element 97 to one another. Preferably, the first spring element 34 is arranged in a position rotated by 180° with relation to the second spring element 35.

FIG. 11 shows another preferred embodiment of the present invention, wherein three spring elements 34, 35, 36 are provided. The individual spring elements 34, 35, 36 are preferably identical in structure. Furthermore, the spring elements 34, 35, 36 are preferably arranged with a first end 76 in a recess or a bore hole 84 and respectively interact with a second end 78 with a holding part 92, 94, 96, in particular, in a form-fitting manner. Preferably, two spring elements 34, 35, 36 are each held in a form-fitting manner by each holding element 92, 94, 96. Furthermore, the relative position of the first recess or bore hole 84 with relation to the first holding element 92 and the third holding element 96 corresponds to the relative position of the second recess or bore hole 88 with relation to the second holding element 94 and the first holding element 92 and/or the third recess or bore hole 89 with relation to the third holding element 96 and the second holding element 94.

FIG. 11 II. shows the arrangement shown in FIG. 11 I. without holding elements 92. 94, 96. The embodiment shown in FIGS. 12 I. and 12 II. essentially corresponds to the embodiment shown in FIGS. 11 I and 11 II., wherein the spring elements 34, 35, 36 are designed to for a line contact to the connecting and disconnecting element 6. The spring elements 34, 35, 36 therefore comprise a bent positioning component 59 between their second end 78 and the bent component 54. This embodiment is favourable since a greater contact area between the spring elements 34, 35, 36 and the connecting and disconnecting element 6 is created, whereby greater forces can be transferred between the spring elements 34, 35, 36 and the connecting and disconnecting element 6.

Thereby, the present invention relates to a tap 1 for producing and disconnecting a fluidic connection between at least two connector parts 2, 4 of a fluidic connection. The tap according to the invention comprises a connecting and disconnecting element 6, a manual actuating element 10 for rotating the connecting and disconnecting element 6, wherein the manual actuating element 10 and the connecting and disconnecting element 6 are coupled mechanically, a main body 12, wherein the main body 12 has the connector parts 2, 4 and an interior space 14 for receiving the connecting and disconnecting element 6, wherein the interior space 14 has a contact surface 16 for being brought into contact with the connecting and disconnecting element 6, wherein the contact surface 16 is of negative configuration at least in sections with respect to the conical surface component 28 of the connecting and disconnecting element 6, wherein at least one spring element 34 is provided for form-fitting fixing the position of the connecting and disconnecting element 6 with respect to the main body and for producing a surface pressure between the contact surface 16 and the conical surface component of the connecting and disconnecting element 6, wherein the spring element 34 is arranged in or on the main body 12, and the connecting and disconnecting element 6 can be moved in the axial direction thereof with respect to the spring element 34 for dismantling or assembling purposes.

Reference list 1 dismantlable tap 2 first connector part 4 second connector part 5 connector part formed on the manual actuating element 6 connecting and disconnecting element 8 passage opening 10 manual actuating element 11 base part 12 main body 14 interior space 16 contact surface 19 outer surface of the main body 22 conical section with the smallest diameter 24 extension 26 handle part 28 conical surface component 30 lower end of the main body 32 upper end of the main body 34 spring element 35 another spring element 36 third spring element 40 circumferential wall 42 fixing agents 43 another fixing agent 44 pressure point 50 first elongated component 52 second elongated component 54 bent component 55 another bent component 56 first positioning component 58 second positioning component 59 bent positioning component 60 first holding component 62 second holding component 64 bent component between the holding component and the first positioning component 66 bent component between the second holding component and the second positioning component 68 main section 70 first secondary section 72 second secondary section 74 third holding component/central elongated holding component 76 first end of the spring element 78 second end of the spring element 80 first pin component 82 second pin component 84 first bore hole 88 second bore hold 89 third bore hole 90 guide 92 first holding element 94 second holding element 96 third holding element 97 fourth holding element 98 main spring contact surface 99 spring guide 100 securing part 102 recess 104 first holding tab 106 second holding tab A axial extension direction and axial direction 108 power transmission part

The invention claimed is:

1. A tap for producing and disconnecting a fluidic connection between at least two connector parts, the tap comprising:
   at least one connecting and disconnecting element configured to: (i) produce the fluidic connection, and (ii) disconnect the fluidic connection, the connecting and disconnecting element being conical at least in sections and having at least one passage opening configured to produce the fluidic connection,
   a manual actuating element configured to rotate the connecting and disconnecting element, the manual actuating element being mechanically coupled to the connecting and disconnecting element,
   a main body having at least one connector part and an interior space configured to receive the connecting and disconnecting element, the interior space having a contact surface configured to contact with the connecting and disconnecting element, wherein:
   the contact surface is of negative configuration at least in sections with respect to a conical surface component of the connecting and disconnecting element,
   at least one spring element is provided for form-fitting fixing the position of the connecting and disconnecting element with respect to the main body, and the spring element is arranged in or on the main body,
   the connecting and disconnecting element comprises an extension that adjoins a section of the conical surface component, the section having a diameter that is smaller than the diameter of another section of the conical surface component,
   the extension includes a wall, and the at least one spring element or at least one fixing agent impinged by the spring element is configured to contact the wall to produce a tensile force within the connecting and disconnecting element,
   the spring element includes at least two elongated components that are connected to each other by a bent component,
   the two elongated components are designed as two elongated positioning components and contact the wall for producing a tensile force within the connecting and disconnecting element,
   the spring element additionally comprises at least two elongated holding components, the elongated holding components form the ends of the spring element and are coupled to the main body in a form-fitting or frictionally locking manner, each positioning component is connected to a holding component via a bent component, the spring element forms an M-shaped form, and the wrap angle of the radius of the bent component connecting the two positioning components is smaller than the wrap angle of the radius of a bent component, which connects a holding component to a positioning component.

2. The tap according to claim 1, wherein the spring element is additionally provided for producing a surface pressure and/or for fixing contact faces between the contact surface and the conical surface component of the connecting and disconnecting element.

3. The tap according to claim 1, wherein the connecting and disconnecting element for dismantling or assembling can be moveable against the spring element in the axial extension direction of the connecting and disconnecting element.

4. A tap for producing and disconnecting a fluidic connection between at least two connector parts, the tap comprising:

at least one connecting and disconnecting element configured to: (i) produce the fluidic connection, and (ii) disconnect the fluidic connection, the connecting and disconnecting element being conical at least in sections and having at least one passage opening configured to produce the fluidic connection, a manual actuating element configured to rotate the connecting and disconnecting element, the manual actuating element being mechanically coupled to the connecting and disconnecting element, a main body including at least one connector part and an interior space configured to receive the connecting and disconnecting element, the interior space having a contact surface configured to contact with the connecting and disconnecting element, wherein:

the contact surface is of negative configuration at least in sections with respect to a conical surface component of the connecting and disconnecting element, at least one spring element is provided for form-fitting fixing the position of the connecting and disconnecting element with respect to the main body, and the spring element is arranged in or on the main body, the connecting and disconnecting element includes an extension that adjoins a section of the conical surface component, the section having a diameter that is smaller than the diameter of another section of the conical surface component, the extension includes a wall, and the at least one spring element or at least one fixing agent impinged by the spring element contacts the wall for producing a tensile force within the connecting and disconnecting element, the spring element includes at least two elongated components that are connected to each other by a bent component, the two elongated components are configured as two elongated positioning components and contact the wall to produce a tensile force within the connecting and disconnecting element, and the bent component includes sections with different radii such that a main section comprises a radius that is greater than the radii of two secondary sections, and the positioning components are connected to the main section via the secondary sections.

5. The according to claim 4, wherein the spring element is additionally provided for producing a surface pressure and/or for fixing contact faces between the contact surface and the conical surface component of the connecting and disconnecting element.

6. Tap according to claim 4, wherein the connecting and disconnecting element for dismantling or assembling can be moveable against the spring element in the axial extension direction of the connecting and disconnecting element.

7. The tap according to claim 6, wherein a plurality of structurally identical spring elements are provided.

8. The tap according to claim 7, wherein at least three structurally identical spring elements are provided, and each spring element is rotatably mounted with one end in a recess around a rotational axis and is held in a form-fitting manner by holding elements with another end in the extension direction of the rotational axis.

9. A tap for producing and disconnecting a fluidic connection between at least two connector parts, the tap comprising:

at least one connecting and disconnecting element configured to: (i) produce the fluidic connection, and (ii) disconnect the fluidic connection, the connecting and disconnecting element being conical at least in sections and having at least one passage opening configured to produce the fluidic connection, a manual actuating element configured to rotate the connecting and disconnecting element, the manual actuating element being mechanically coupled to the connecting and disconnecting element, a main body including at least one connector part and an interior space configured to receive the connecting and disconnecting element, the interior space having a contact surface configured to contact with the connecting and disconnecting element, wherein:

the contact surface is of negative configuration at least in sections with respect to a conical surface component of the connecting and disconnecting element, at least two spring elements are provided for form-fitting fixing the position of the connecting and disconnecting element with respect to the main body, and at least one spring element of the at least two spring elements is arranged in or on the main body, the connecting and disconnecting element includes an extension that adjoins a section of the conical surface component, the section having a diameter that is smaller than the diameter of another section of the conical surface component, the extension includes a wall, and at least one spring element of the at least two spring elements or at least one fixing agent impinged by one of the at least two spring elements contacts the wall to produce a tensile force within the connecting and disconnecting element, the at least two spring elements each includes an elongated holding component and an elongated positioning component, the holding component and the positioning component being respectively connected to each other via a bent component, the positioning components contact the wall to produce a tensile force within the connecting and disconnecting element, the elongated holding components are coupled to the main body in a formfitting or frictionally locking manner, the positioning components each with an end spaced away from the bent component interact with the main body in a form-fitting manner, and a pin component adjoins the holding components respectively, which orthogonally extends towards a level, which is spanned by the positioning components and the holding components, and each pin component is inserted within a recess or bore hole in the main body respectively.

10. A tap for producing and disconnecting a fluidic connection between at least two connector parts, the tap comprising:
at least one connecting and disconnecting element configured to: (i) produce the fluidic connection, and (ii) disconnect the fluidic connection, the connecting and disconnecting element being conical at least in sections and having at least one passage opening configured to produce the fluidic connection,
a manual actuating element configured to rotate the connecting and disconnecting element, the manual actuating element being mechanically coupled to the connecting and disconnecting element,
a main body including at least one connector part and an interior space configured to receive the connecting and disconnecting element, the interior space having a contact surface configured to contact with the connecting and disconnecting element, wherein:
wherein the contact surface is of negative configuration at least in sections with respect to a conical surface component of the connecting and disconnecting element,
at least one spring element is provided for form-fitting fixing the position of the connecting and disconnecting element with respect to the main body, and the spring element is arranged in or on the main body,
the connecting and disconnecting element includes an extension that adjoins a section of the conical surface component, the section having a diameter that is smaller than the diameter of another section of the conical surface component,
the extension includes a wall, and the at least one spring element or at least one fixing agent impinged by the spring element contacts the wall to produce a tensile force within the connecting and disconnecting element,
the main body includes a spring guide configured to receive the spring element that includes a bent section, the spring element is coupled to the spring guide via the bent section,
the bent section is a part of a bent component that encloses the main body in the circumferential direction, and the bent section forms a securing part, which is coupled to the main body or the fixing agent,
the bent section forms another bent component which adjoins the bent component, and the other bent component and the bent component are spaced away from each other by an elongated component, and
the other bent component and the straight component are surrounded by the bent component.

11. The tap according to claim 10, wherein the spring element is configured to produce a surface pressure and/or for fixing contact faces between the contact surface and the conical surface component of the connecting and disconnecting element.

12. The tap according to claim 10, wherein the connecting and disconnecting element for dismantling or assembling is configured to move against the spring element in the axial extension direction of the connecting and disconnecting element.

13. A tap for producing and disconnecting a fluidic connection between at least two connector parts, the tap comprising:
at least one connecting and disconnecting element configured to: (i) produce the fluidic connection, and (ii) disconnect the fluidic connection, the connecting and disconnecting element being conical at least in sections and having at least one passage opening configured to produce the fluidic connection,
a manual actuating element configured to rotate the connecting and disconnecting element, the manual actuating element being mechanically coupled to the connecting and disconnecting element,
a main body including at least one connector part and an interior space configured to receive the connecting and disconnecting element, the interior space having a contact surface configured to contact with the connecting and disconnecting element, wherein:
the contact surface is of negative configuration at least in sections with respect to a conical surface component of the connecting and disconnecting element,
at least one spring element is provided for form-fitting fixing the position of the connecting and disconnecting element with respect to the main body, and the spring element is arranged in or on the main body,
the connecting and disconnecting element includes an extension that adjoins a section of the conical surface component, the section having a diameter that is smaller than the diameter of another section of the conical surface component,
the extension comprises a wall, and the at least one spring element or at least one fixing agent impinged by the spring element contacts the wall to produce a tensile force within the connecting and disconnecting element,
the spring element forms a securing part that extends in an elongated manner, which is configured to be introduced into a recess configured to receive the securing part or a recipient region of the main body, and
a power transmission part adjoins the securing part, and via the power transmission part, the fixing element is impinged with a pressing force in the direction of the connecting and disconnecting element.

14. The tap according to claim 13, wherein the spring element is configured to produce a surface pressure and/or for fixing contact faces between the contact surface and the conical surface component of the connecting and disconnecting element.

15. The tap according to claim 13, wherein the connecting and disconnecting element for dismantling or assembling is configured to move against the spring element in the axial extension direction of the connecting and disconnecting element.

16. A tap for producing and disconnecting a fluidic connection between at least two connector parts, the tap comprising:
at least one connecting and disconnecting element configured to: (i) produce the fluidic connection, and (ii) disconnect the fluidic connection, the connecting and disconnecting element being conical at least in sections and having at least one passage opening configured to produce the fluidic connection,
a manual actuating element configured to rotate the connecting and disconnecting element, the manual actuating element being mechanically coupled to the connecting and disconnecting element,
a main body including at least one connector part and an interior space configured to receive the connecting and disconnecting element, the interior space having a contact surface configured to contact with the connecting and disconnecting element, wherein:

the contact surface is of negative configuration at least in sections with respect to a conical surface component of the connecting and disconnecting element, at least one spring element is provided for form-fitting fixing the position of the connecting and disconnecting element with respect to the main body, and the spring element is arranged in or on the main body, the connecting and disconnecting element includes an extension that adjoins a section of the conical surface component, the section having a diameter that is smaller than the diameter of another section of the conical surface component, the extension includes a wall, and the at least one spring element or at least one fixing agent impinged by the spring element contacts the wall to produce a tensile force within the connecting and disconnecting element, and a plurality of fixing agents are provided such that the fixing agents are each moveable in a radial direction via a guide designed with the main body and are configured to press towards each other via the spring element.

17. The tap according to claim 16, wherein the spring element is configured to produce a surface pressure and/or for fixing contact faces between the contact surface and the conical surface component of the connecting and disconnecting element.

18. The tap according to claim 16, wherein the connecting and disconnecting element for dismantling or assembling is configured to move against the spring element in the axial extension direction of the connecting and disconnecting element.

* * * * *